June 4, 1940.　　　　L. W. YOUNG　　　　2,203,210

FLEXIBLE CUTTING NOZZLE

Filed April 21, 1939

INVENTOR
LLOYD W. YOUNG
BY
ATTORNEY

Patented June 4, 1940

2,203,210

UNITED STATES PATENT OFFICE 2,203,210

FLEXIBLE CUTTING NOZZLE

Lloyd W. Young, Scotch Plains, N. J., assignor to Oxweld Acetylene Company, a corporation of West Virginia Application April 21, 1939, Serial No. 269,103

13 Claims. (Cl. 158—27.4)

This invention relates to the art of metal cutting and more particularly to means for adapting a straight cutting blowpipe mounted on a cutting machine to the cutting of beveled plate edges.

The blowpipe mounted on a cutting machine is usually of the straight type, in which the handle, stem, head and tip are in axial alignment, and is usually mount d in a vertical position so as to deliver the cutting jet perpendicularly against a horizontal surface. This method of mounting is satisfactory when the machine is used to make vertical cuts.

However, when it is desired to cut a plate edge at an angle to the vertical, it is necessary to adjust the entire blowpipe to the desired angle of cut, and, when the operation is finished, to readjust the blowpipe to a true vertical position. Moreover, some cutting machines, particularly the smaller models, are so compactly arranged that adjustment of the entire blowpipe is practically impossible, or at least the amount of possible adjustment is very limited. A means for permitting rapid adaptation of such a cutting blowpipe to the beveling of plate edges has long been desired.

Prior attempts to achieve these results have been directed to a re-design of the entire blowpipe. The results of these attempts have been generally unsatisfactory due to the complicated designs and constructions, and the fact that the entire blowpipe cannot be maintained in a true vertical plane.

It is therefore among the objects of this invention to provide a flexible cutting nozzle which will permit a cutting machine blowpipe to be used for the beveling of plate edges; which can be mounted on the blowpipe head and replace the blowpipe nozzle or tip; which can be adjusted throughout a wide range to form a cut at any desired angle; which directs preheating gas and cutting gas in correct proportion against the work to be cut irrespective of the angular relation of the parts of the nozzle; and which is compact in design, economical to manufacture and sturdily constructed.

Figure 1:
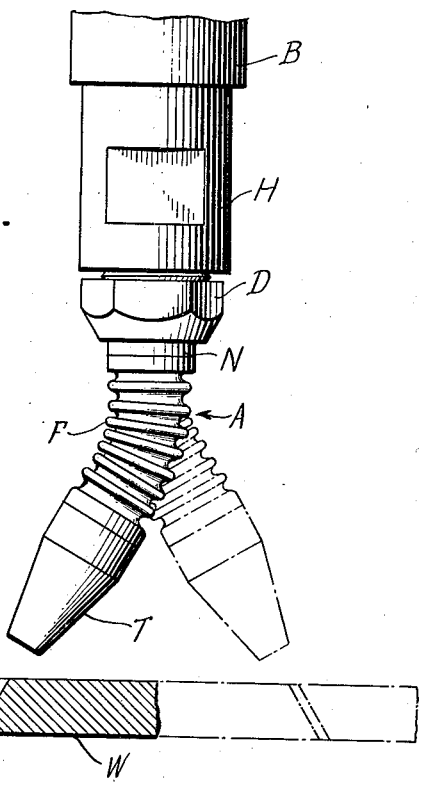
Figure 2:
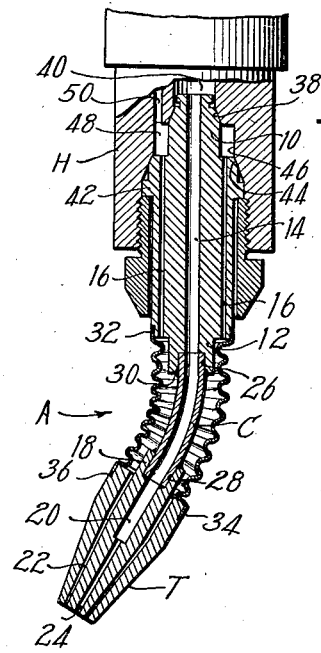

These and other objects of the invention will in part be obvious and in part become apparent from the following description and the accompanying drawing, in which:

Fig. 1 is an elevational view of the flexible cutting nozzle of the invention showing its relation to the work to be cut; and Fig. 2 is a central section through the flexible cutting nozzle shown in Fig. 1.

In general, the flexible cutting nozzle A of the invention includes a member such as an elongated nipple N operatively connected to a tip or nozzle T by spaced concentric means comprising an inner central flexible element such as a metallic tube C and an outer flexible element such as a metallic bellows F. The nipple N is formed with seats adapted to engage the seating surfaces in the head H of a cutting blowpipe B, in which the nipple may be secured by the usual nozzle clamping nut D. The tip T may be adjusted to any desired angle with respect to the nipple N to deliver pre-heating gas jets and a cutting gas jet to the work W to make a cut therethrough at a given angle.

Referring more specifically to the drawing, the nipple N is generally tubular in form and includes integral reduced extensions 10 and 12 at opposite ends thereof. A central cutting gas passage 14 and circumferentially spaced preheat gas passages 16 are drilled through the nipple N from one end to the other thereof, the cutting passage 14 extending through each of the extensions 10 and 12.

The nozzle or tip T is formed at its inner end with a reduced tubular extension 18, and a central cutting gas passage 20 and circumferentially spaced preheat gas passages 22 are drilled completely through the tip. The central cutting gas passage 20 extends through the reduced tubular extension 18 and the exit portion of this passage is reduced in diameter as at 24.

The tubular extension 12 on the nipple N and the tubular extension 18 on the tip T are each recessed as at 26 and 28, respectively, to receive the ends of the central tube C, which ends may be sealed therein by suitable means such as solder 30. The flexible metallic bellows F is cupped at both ends as at 32 and 34, the end 32 being seated over a reduced portion at the outer end of the nipple N and the end 34 over a reduced portion at the inner end of the tip or nozzle T. The bellows F may be sealed to the nipple N and the tip T by suitable means such as solder 36.

The reduced tubular extension 10 on the nipple N is adapted to enter the usual recess 38 in cutting gas passage 40 of the blowpipe head H. At the base of the tubular extension 10, the nipple N is formed with an integral projecting collar 42 adapted to engage a shoulder 44 formed in the nozzle receiving recess 46 in the head H, and this collar forms one wall of a chamber 48 communicating with the preheat gas passage 50 in the head H.

Cutting gas passes from the passage 40 in the head H, through passage 14 of nipple N and tube C to the cutting gas passage 20 in the tip T. Similarly, the preheat gas mixture issuing from passage 50 in the head H enters chamber 48 and passes through passages 16 in nipple N and the space between tube C and bellows F to the passages 22 in tip T.

When it is desired to make a beveled cut, the nut D is loosened and the usual cutting tip removed from the blow-pipe head, after which the nut D may be used to clamp the flexible cutting nozzle A to the blowpipe head H in place of the usual cutting tip. The outer diameter of the flexible metallic bellows F is equal to or less than the diameter of the nipple N and the tip T, so that the clamping nut D may be readily slid thereover to permit the flexible cutting nozzle A to be secured in the head H of the blowpipe rapidly and easily.

The tip may be bent with the fingers to any desired beveling angle within the flexing limit of the bellows F. The stiffness of the central tube C is sufficient to maintain the parts of the nozzle at any angle to which tip T may be bent. There is thus provided a simple means for adapting a machine cutting blowpipe to the bevel cutting of plate edges, which means may be readily and easily set to any desired angle and is of sufficient rigidity of construction to retain this angle until such time as it is desired to change the angle of cut.

While a specific embodiment of the invention has been illustrated and described in detail, it will be obvious that the invention may be otherwise embodied and certain dimensions and interrelations of parts changed so long as the objects of the invention are attained.

What is claimed is:

1. For use with a blowpipe having a head formed with seating surfaces, a blowpipe nozzle formed with seats adapted to engage said seating surfaces, and a clamping nut adapted removably to secure said blowpipe nozzle to said head, said head being drilled to form a cutting gas passage and preheat gas passages; a flexible cutting nozzle comprising, in combination, a member formed with seats adapted to engage said seating surfaces and drilled to form a cutting gas passage and preheat gas passages; a tip drilled to form a cutting gas passage and preheating gas passages; a first flexible element connecting the cutting gas passage in said member to the cutting gas passage in said tip; and a second flexible element connecting the preheat gas passages in said member to the preheat gas passages in said tip, said second flexible element surrounding said first flexible element in concentric spaced relation thereto; each of said elements being secured to said member and to said tip.

2. A flexible cutting nozzle as claimed in claim 1, in which one of said elements comprises a flexible metallic bellows.

3. A flexible cutting nozzle as claimed in claim 1, in which one of said elements comprises a flexible metallic tube of sufficient rigidity to maintain said tip in adjusted angular relation to said member.

4. A flexible cutting nozzle as claimed in claim 1, in which one of said elements comprises a flexible metallic bellows and the other of said elements is of sufficient rigidity to maintain said tip in adjusted position with respect to said member.

5. A flexble cutting nozzle as claimed in claim 1, in which the ends of said first element are seated in recesses formed in the opposed ends of the respective cutting gas passages in said member and in said tip.

6. A flexible cutting nozzle as claimed in claim 1, in which said member and said tip are each formed with a centrally disposed, reduced tubular extension, said cutting gas passages in said member and tip extend through said extensions, said extensions are each formed with an enlarged recess concentric with the cutting gas passage, and said first element comprises a flexible metallic tube, the ends of which are seated in and sealed to said recesses.

7. A flexible cutting nozzle as claimed in claim 1, in which said second element comprises a flexible metallic bellows having cupped ends, one of said cupped ends being seated upon and sealed to a reduced portion at an end of said member and the other of said cupped ends being seated upon and sealed to a reduced portion at an end of said tip.

8. A flexible cutting nozzle as claimed in claim 1, in which said member and said tip are each formed with a centrally disposed, reduced tubular extension, said cutting gas passages in said member and tip extend through said extensions, said extensions are each formed with an enlarged recess concentric with the cutting gas passage, and said first element comprises a flexible metallic tube, the ends of which are seated in and sealed to said recesses; and said second element comprises a flexible metallic bellows having cupped ends, one of said cupped ends being seated upon and sealed to a reduced portion at an end of said member and the other of said cupped ends being seated upon and sealed to a reduced portion at an end of said tip.

9. A flexible cutting nozzle as claimed in claim 1, in which said member comprises an elongated nipple formed with an integral collar adapted to be engaged by said clamping nut to secure said flexible cutting nozzle to the head of said blowpipe.

10. A flexible cutting nozzle as claimed in claim 1, in which said nipple is formed with a projecting collar adapted to engage a portion of said blowpipe head; and the respective external diameters of said member, said tip and said second flexible element are each less than the internal diameter of said clamping nut, whereby said clamping nut may be slid over said flexible cutting nozzle to engage the collar on said member to secure said flexible cutting nozzle in detachable operative relation in said blowpipe head when said blowpipe nozzle has been removed therefrom.

11. A flexible cutting nozzle comprising, in combination, an elongated nipple; a tip; and spaced flexible concentric elements connecting said nipple to said tip; said nipple and said tip each having a cutting gas passage and preheat gas passages therein; the inner of said elements operatively connecting the cutting gas passage in said nipple to the cutting gas passage in said tip and the outer of said elements connecting the preheat gas passages in said nipple to the preheat gas passages in said tip.

12. A flexible cutting nozzle as claimed in claim 11, in which said nipple is formed with means whereby it may be operatively and detachably secured in the head of a cutting blowpipe.

13. A flexible cutting nozzle as claimed in claim 11, in which the outer of said elements comprises a flexible metallic bellows and the inner of said elements comprises a flexible metallic tube of sufficient rigidity to maintain said tip in adjusted angular relation to said nipple.

LLOYD W. YOUNG.